April 15, 1958  E. A. WINTERBAUER  2,830,464
FLEXIBLE STEERING WHEEL
Filed March 2, 1956
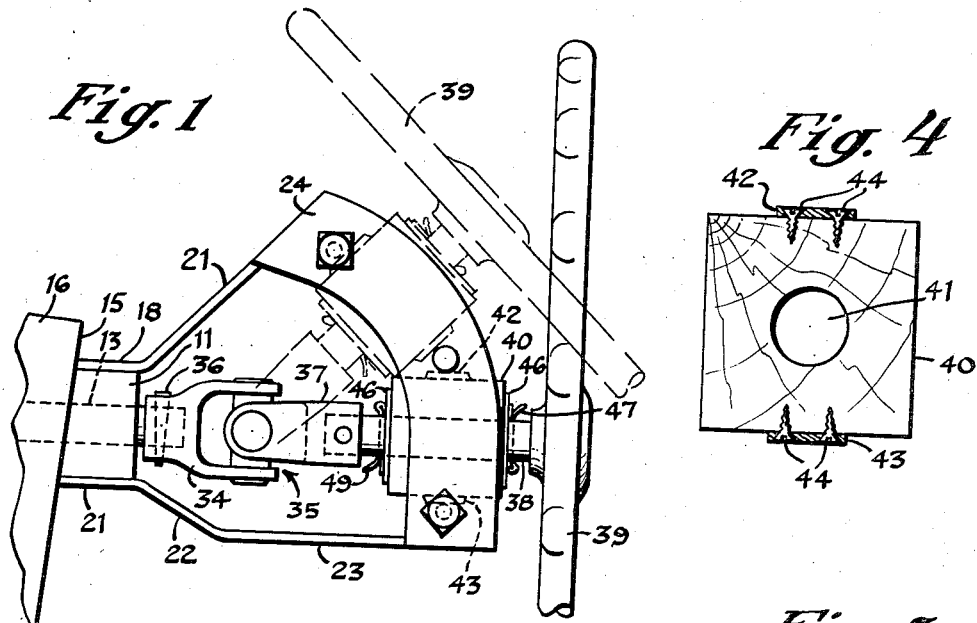
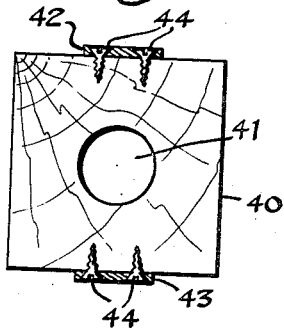
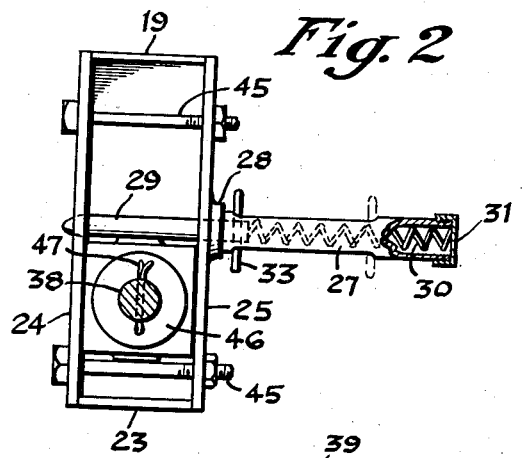
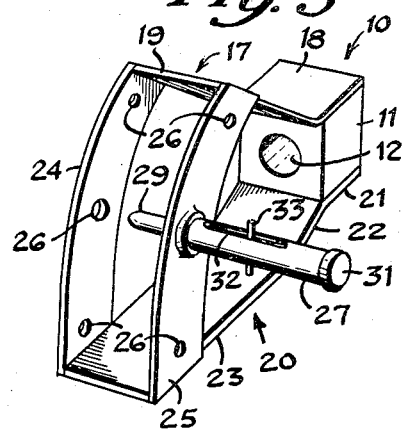
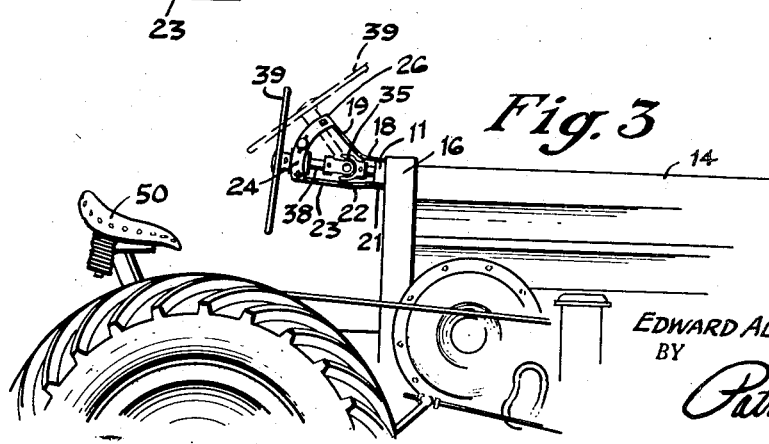
INVENTOR.
EDWARD ALBERT WINTERBAUER
BY
Patrick D. Beavers
ATTORNEY United States Patent Office 2,830,464
Patented Apr. 15, 1958

2,830,464

FLEXIBLE STEERING WHEEL

Edward A. Winterbauer, Athens, Ill.

Application March 2, 1956, Serial No. 569,024

2 Claims. (Cl. 74—555)

This invention relates to a steering wheel assembly and more particularly to a steering wheel assembly that may be adjusted by an operator to suit the peculiar circumstances that arise from the use of a steering wheel that is not adjustable.

Many farmers desire to drive a tractor in a standing position in order to watch the operation of the farm implement connected to the front of the tractor. With a fixed steering wheel such an operation becomes tiresome and difficult.

In some instances the seats on the tractors are adjustable, but with a fixed steering wheel such as arrangement does not overcome all of the difficulties arising at the present time.

An object of the invention is, therefore, to provide an adjustable steering wheel that may be adjusted so that the operator may stand or sit down as he desires while driving his tractor.

With the above and other objects and advantages in view, the invention consists of the novel details of construction, arrangement and combination of parts more fully hereinafter described, claimed and illustrated in the accompanying drawing in which:

Fig. 1 is an elevational view showing the steering wheel embodying the invention in two driving positions;

Fig. 2 is a vertical sectional view of the mounting means for the steering wheel;

Fig. 3 is an elevational view, partly broken away, of a tractor with a steering wheel embodying the invention installed thereon;

Fig. 4 is an elevational view, partly in section, of the mounting block for the steering wheel; and Fig. 5 is a perspective view of the mounting assembly for the steering wheel.

Referring more in detail to the drawing, wherein like parts are designated by like reference numerals, the reference numeral 10 is used to designate the mounting assembly for the steering wheel.

The mounting assembly 10, Fig. 5, comprises a block 11 having a bore 12 to receive a steering column 13 of a tractor 14. The block 11 has a rear face 15 that will conform to the shape of the panel 16 on the tractor 14.

A strap 17 of the mounting assembly 10 comprises a flange portion 18 that is rigidly secured to the upper surface of the block 11 and an outwardly extending angular portion 19. A strap 20 of the mounting assembly 10 is similar in shape to the strap 17 having a flange portion 21 that is rigidly secured to the lower surface of the block 11, an outwardly extending angular portion 22 and a portion 23 contiguous with the portion 22 that is in a horizontal plane below the horizontal plane of the flange 21.

Secured to the opposite edges of the straps 17 and 20, adjacent the forward ends thereof, are a pair of arcuate plates 24 and 25, respectively.

Each of the plates 24 and 25 has three equally spaced openings 26 therein and a tubular housing 27 is secured to the plate 25, in communication with the central opening 26 in the plate 25, and extending outwardly of the plate 25 at right angles thereto. A collar 28 rigidly secures one end of the housing 27 to the plate 25.

A latch bolt 29 is slidably mounted in the housing 27 and is biased outwardly of the housing 27 by a coil spring 30. A cap 31 threaded on the outer end of the housing 27 permits replacement of the spring as required.

The housing 27 is provided with oppositely disposed elongated slots 32 to receive a pin 33 that extends transversely of the housing 27 and passes through the bolt 29. The pin 33 extends outwardly of the housing 27 to permit the grasping thereof by the fingers to permit retraction of the bolt 29.

A part 34 of a universal joint 35 is connected to the column 13 by a pin 36 and the other part 37 of the joint 35 is connected to a steering column 38 that is connected to a steering wheel 39.

A square block of wood 40, Fig. 4, is mounted on the column 38 by means of a centrally located bore 41 and wear plates 42 and 43, respectively, are secured to the upper and lower surfaces of the block 40 by wood screws 44.

The block 40 is positioned between the arcuate plates 24 and 25 which provides a trackway for the block 40 and bolts 45 extending through the upper and lower alined openings 26 in the plates 24 and 25 limit the movement of the block 40. A washer 46 is positioned on the steering column 38 in contact with the front face of the block 40 and a cotter pin 47 retains the washer 46 in position. A washer 48 is positioned on the steering column 38 in contact with the rear face of the block 40 and a cotter pin 49 retains the washer 48 in position.

The steering wheel embodying the invention permits the operator of a tractor to sit or stand while driving.

In the full line position of Fig. 1, the steering wheel 39 is in position to permit the operator to stand and drive. If the operator desires to sit down the bolt 29 is retracted by means of the pin 33, and the steering wheel is moved to the dotted line position of Fig. 1, then the operator can sit and drive.

The seat 50 of the tractor 14 can be adjustable as in some instances or it may be fixed as in other instances, depending upon the type of tractor on which the seat is installed.

The retraction of the pin 29 permits movement of the steering wheel 39 as desired and when the block 40 is in proper position the bolt 29 is released to enter the central opening 26 in alinement therewith.

The wear plates 42 and 43 prevent wear on the block 40 and also prevent undue movement of the wheel 39 when it is fixed in place by the bolt 29.

The universal joint 35 will permit the relative movement of the steering columns 13 and 38, as shown in Fig. 1.

The invention can be easily installed and will give the operator a flexible steering wheel that permits easy operation of the tractor to which it is attached.

It is believed that from the foregoing description the operation and construction of the invention will be clear to those skilled in the art and it is to be understood that changes in the minor details of construction, arrangement and combination of parts may be resorted to provided they fall within the spirit of the invention and the scope of the appended claims.

Having thus described the invention what is claimed as new and desired to be secured by Letters Patent is:

1. A steering wheel assembly comprising a sectional steering column, a universal joint connecting the sections of said column, a first block mounted on one section of said column, a steering wheel connected to the outer end of said other section, a pair of straps connected to the upper and lower faces of said first block, a pair of arcuate shaped plates connected to the opposite edges of said straps at the other end thereof, said plates having spaced openings therein, a second block on the section to which the steering wheel is connected, said second block being mounted between said plates, stop bolts extending transversely of said plates to limit the movement of said second block, and a spring biased bolt mounted in one of said straps and adapted to engage said second block to retain said block in adjusted position.

2. A steering wheel assembly comprising a steering column, a universal joint interpolated in said column, a steering wheel connected to one end of said column, a mounting assembly mounted on said column, and latching means in said mounting assembly for retaining said steering column in adjusted position, said mounting assembly comprising a block mounted on said column, a pair of straps connected to opposite faces of said block, arcuate plates connected to said straps, and a block mounted on said column movable within said arcuate plates.

References Cited in the file of this patent

UNITED STATES PATENTS

| | | |
|---|---|---|
| 612,044 | Lester | Oct. 11, 1898 |
| 1,204,724 | White et al. | Nov. 14, 1916 |
| 1,457,722 | Busby | June 5, 1923 |

FOREIGN PATENTS

| | | |
|---|---|---|
| 612,550 | France | Aug. 2, 1926 |